(12) United States Patent
Chang et al.

(10) Patent No.: US 9,401,960 B2
(45) Date of Patent: Jul. 26, 2016

(54) SCALABLE CLOUD STORAGE ARCHITECTURE

(71) Applicant: International Business Machines Corporation, Armonk, NY (US)

(72) Inventors: Rong N. Chang, Pleasantville, NY (US); Byung Chul Tak, Yorktown Heights, NY (US); Chunqiang Tang, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 14/014,888

(22) Filed: Aug. 30, 2013

(65) Prior Publication Data

US 2013/0346557 A1 Dec. 26, 2013

Related U.S. Application Data

(63) Continuation of application No. 12/986,466, filed on Jan. 7, 2011, now abandoned.

(51) Int. Cl.
| | |
|---|---|
| *G06F 12/00* | (2006.01) |
| *G06F 13/00* | (2006.01) |
| *G06F 13/28* | (2006.01) |
| *H04L 29/08* | (2006.01) |
| *G06F 9/455* | (2006.01) |

(52) U.S. Cl.
CPC ........ *H04L 67/1097* (2013.01); *G06F 9/45558* (2013.01); *G06F 2009/45579* (2013.01)

(58) Field of Classification Search
CPC ............ H04L 67/1097; G06F 9/45558; G06F 2009/45579
USPC ........................................................ 711/128
See application file for complete search history.

(56) References Cited

U.S. PATENT DOCUMENTS

| | | | |
|---|---|---|---|
| 2003/0046493 A1* | 3/2003 | Coulson ................ | G06F 12/124 711/118 |
| 2005/0021764 A1* | 1/2005 | Barrall .................... | H04L 29/06 709/227 |
| 2005/0125513 A1* | 6/2005 | Sin-Ling Lam .... | G06F 9/44505 709/220 |
| 2011/0055827 A1* | 3/2011 | Lin ...................... | G06F 12/0842 718/1 |

OTHER PUBLICATIONS

U.S. Official Action mailed Feb. 25, 2013 in related U.S. Appl. No. 12/986,466.

* cited by examiner

*Primary Examiner* — Charles Rones
*Assistant Examiner* — Sidney Li
(74) *Attorney, Agent, or Firm* — Scully, Scott, Murphy & Presser, P.C.; Louis J. Percello, Esq.

(57) ABSTRACT

A virtual storage module operable to run in a virtual machine monitor may include a wait-queue operable to store incoming block-level data requests from one or more virtual machines. In-memory metadata may store information associated with data stored in local persistent storage that is local to a host computer hosting the virtual machines. The data stored in local persistent storage replicates a subset of data in one or more virtual disks provided to the virtual machines. The virtual disks are mapped to remote storage accessible via a network connecting the virtual machines and the remote storage. A cache handling logic may be operable to handle the block-level data requests by obtaining the information in the in-memory metadata and making I/O requests to the local persistent storage or the remote storage or combination of the local persistent storage and the remote storage to service the block-level data requests.

20 Claims, 6 Drawing Sheets

FIG. 5

SCALABLE CLOUD STORAGE ARCHITECTURE

CROSS-REFERENCE TO RELATED APPLICATIONS

This application is a continuation of U.S. Ser. No. 12/986,466, filed on Jan. 7, 2011, the entire content and disclosure of which is incorporated herein by reference.

FIELD

The present application generally relates to computer systems and computer storage, and more particularly to virtual storage and storage architecture.

BACKGROUND

Designing a storage system is a challenging task. For instance, in Cloud Computing, high degree of virtualization increases the demand for storage spaces and this requires the use of remote storage spaces. However, uncontrolled access to the remote storage from large number of virtual machines can easily saturate the networking infrastructure and affect the entire systems using the network.

More particularly, for example, in an IaaS (Infrastructure-as-a-Service) cloud services, storage needs of VM (Virtual Machine) instances are met through virtual disks (i.e. virtual block devices). However, it is nontrivial to provide virtual disks to VMs in an efficient and scalable way for a couple of reasons. First, a VM host may be required to provide virtual disks for a large number of VMs. It is difficult to ascertain the largest possible storage demands and physically provision them all in the host machine. On the other hand, if the storage spaces for virtual disks are provided through remote storage servers, aggregate network traffic due to storage accesses from VMs can easily deplete the network bandwidth and cause congestion.

BRIEF SUMMARY

A storage system and method for handling data for virtual machines, for instance, for scalable cloud storage architecture, may be provided. The system, in one aspect, may include a virtual storage module operable to run in a virtual machine monitor. The virtual storage module may include a wait-queue operable to store incoming block-level data requests from one or more virtual machines, and in-memory metadata for storing information associated with data stored in local persistent storage that is local to a host computer hosting the virtual machines. The data stored in local persistent storage may be replication of a subset of data in one or more virtual disks provided to the virtual machines, the virtual disks being mapped to remote storage accessible via a network connecting the virtual machines and the remote storage. A cache handling logic may be operable to handle the block-level data requests by obtaining the information in the in-memory metadata and making I/O requests to the local persistent storage or the remote storage or combination of the local persistent storage and the remote storage to service the block-level data requests.

A method for handling data storage for virtual machines, in one aspect, may include intercepting one or more incoming block-level data requests received by a virtual machine monitor from one or more virtual machines. The method may also include obtaining from in-memory metadata, information associated with data of the block-level data request. The in-memory metadata may store information associated with data stored in local persistent storage that is local to a host computer hosting the virtual machines. The data stored in local persistent storage may be replication of a subset of data in one or more virtual disks provided to the virtual machines. The virtual disks may be mapped to remote storage accessible via a network connecting the virtual machines and the remote storage. The method may further include making I/O requests to the local persistent storage or the remote storage or combination of the local persistent storage and the remote storage to service the block-level data requests.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment presents a system (referred to in this disclosure as vStore), which utilizes the host's (e.g., computer server hosting virtual machines) local disk space as a block-level cache for the remote storage (e.g., network attached storages), for example, in order to absorb network traffics from storage accesses. This allows the VMM (Virtual Machine Monitor, a.k.a. hypervisor) to serve VMs' disk input/output (I/O) requests from the host's local disks most of the time, while providing the illusion of much larger storage space for creating new virtual disks. Caching virtual disks at block-level poses special challenges in achieving high performance while maintaining virtual disk semantics. First, after a disk write operation finishes from the VM's perspective, the data should survive even if the host immediately encounters a power failure. That is, the block-level cache should preserve the data integrity in the event of host crashes. To that end, cache handling operations in one embodiment of the present disclosure may ensure consistency between on-disk metadata and data to avoid committing incorrect data to the network attached storage (NAS) during recovery from a crash, while minimizing overheads in updating on-disk metadata. Second, as disk I/O performance is dominated by disk seek times, a virtual disk should be kept as sequential as possible in the limited cache space. Unlike memory-based caching schemes, the performance of an on-disk cache is highly sensitive to data layout. The present disclosure in one embodiment may utilize a cache placement policy that maintains a high degree of data sequentiality in the cache as in the original (i.e., remote) virtual disk. Third, the destaging operation that sends dirty pages back to the remote storage server may be self-adaptive and minimize the impact on the foreground traffic.

In another aspect, a scalable architecture is presented that provides reliable virtual disks (i.e., block devices as opposed to object stores) for virtual machines (VM) in a cloud environment.

Figure 1:
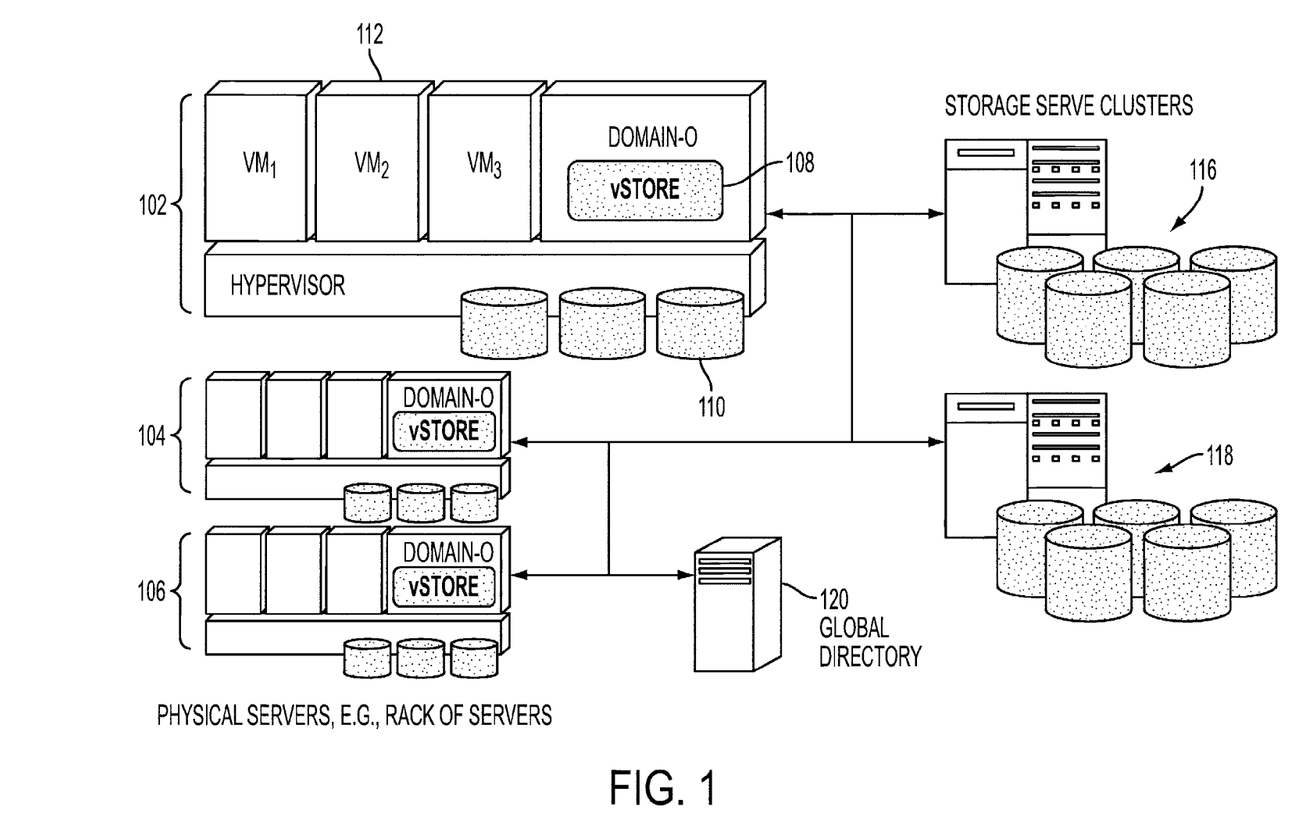
FIG. 1 shows the architecture of a scalable Cloud storage system in one embodiment of the present disclosure.

FIG. 1 shows the architecture of a scalable Cloud storage system in one embodiment of the present disclosure. The architecture may include one or more VM-hosting machines (e.g., 102, 104, 106). A VM-hosting machine is a physical machine that hosts a large number of VMs and has limited local storage space. vStore 108 uses local storage 110 as a block-level cache and provides to VMs 112 the illusion of unlimited storage space. vStore 108 may be implemented in hypervisor 114 and provides persistent cache. vStore 108 performs caching at the block device level rather than the file system level. The hypervisor 114 executes on one or more computer processors and provides a virtual block device to VMs 112, which implies that VMs 112 see raw block devices and they are free to install any file systems on top of it. Thus, hypervisor 114 receives block-level requests and redirects it to the remote storage (e.g., 116, 118).

In one embodiment, single cache space is provided per machine (e.g., 102). The cache tries to replicate the block layout of remote storage (e.g., 116, 118) in the local cache space (local disk) 110.

Storage server clusters (e.g., 116, 118) provide network attached storage to physical machines (e.g., 102, 104, 106). They (e.g., 116, 118) can be either dedicated high-performance storage servers or a cluster of servers using commodity storage devices. The interface to the hypervisors 114 can be either block-level or file-level. If it is the block-level, iSCSI type of protocol can be used between storage servers and clients (i.e., hypervisors). If it is file-level, the hypervisor mounts a remote directory structure and keeps the virtual disks as individual files. Regardless of the protocol between hypervisors and storage servers, the interface between VMs and hypervisor remains at block-level.

The directory server 120 holds the location information about the storage server clusters. When a hypervisor 114 wants to attach a virtual disk to a VM, it consults the directory server 120 to determine the address of a specific storage server (e.g., 116, 118) that currently stores the virtual disk.

The architecture also includes networking infrastructure. Usually network bandwidth within a rack is well-provisioned, but cross-rack network is usually 5-10 times under-provisioned than that of within-rack network. As a result, uncontrolled storage accesses from VMs can easily deplete the network bandwidth and cause congestion.

An example configuration may have rack-mounted servers for hosting virtual machines and remote storage servers to provide storage services to the VMs. A rack may contain more than 20 servers and virtual machine monitors such as Xen-3.1.4 hypervisor installed on each of them. Servers may have processors such as two Intel® Xeon™ CPU of 3.40 GHz and have memory, e.g., 2 giga (G) bytes of memory. They can communicate through 1 Gbps link within the rack. Local storage for each server may be about 1 terabytes and they have a network file system (NFS)-mounted shared storage space that is used to hold VM images for all Virtual Machines. Remote storage servers may have physical hard disks attached, e.g., through Serial Advanced Technology Attachment (SATA) interface.

There may be multiple options when designing a storage system for a Cloud. One solution is to use only local storage. In a Cloud, VMs may use different amounts of storage space, depending on how much the user pays. If every host's local storage space is over-provisioned for the largest possible demand, the cost would be prohibitive. Another solution is to only use network attached storage. That is, a VM's root file system, swap area, and additional data disks are all stored on network attached storage. This solution, however, would incur a large amount of network traffic and disk I/O load on the storage servers.

Sequential disk access can achieve a data rate of 100 MB/s. Even with pure random access, it can reach 10 MB/s. Since 1 Gbps network can sustain roughly about 13 MB/s, four uplinks to the rack-level switch are not enough to handle even one single sequential access. Note that uplinks to the rack-level network switches are limited in numbers and cannot be easily increased in commodity systems. Even for random disk access, it can only support about five VMs' disk I/O traffic. Even with 10 Gbps networks, it still can hardly support thousands of VMs running in one rack (e.g., typical numbers are 42 hosts per rack, and 32 VMs per host, i.e., 1,344 VMs per rack).

vStore 108 takes a hybrid approach that leverages both local storage 110 and network attached storage 116, 118. It still relies on network attached storage 116, 118 to provide sufficient storage space for VMs 112, but utilizes the local storage 110 of a host 102 to cache data and avoid accessing network attached storage 116, 118 as much as possible.

Consider the case of Amazon EC2, where a VM is given one 10 GB virtual disk to store its root file system and another 160 GB virtual disk to store data. The root disk can be stored on local storage due to its small size. The large data disk can be stored on network attached storage and accessed through the vStore cache. Data integrity and performance are two main challenges in the design of vStore. After a disk write operation finishes from the VM's perspective, the data should survive even if the host immediately encounters a power failure. In vStore, system failures can compromise data integrity in several ways. If the host crashes while vStore is in the middle of updating either the metadata or the data and there is no mechanism for detecting the inconsistency between the metadata and the data, after the host restarts, incorrect data may remain in the cache and be written back to the network attached storage. Another case that may compromise data integrity is through violating the semantics of writes. If data is buffered in memory and not flushed to disk after reporting write completion to the VM, a system crash will cause data loss. Taking such semantics in consideration vStore of the present disclosure in one embodiment may be designed to support data integrity.

The second challenge is to achieve high performance, which conflicts with ensuring data integrity and hence may be designed to minimize performance penalties. The performance of vStore may be affected by several factors: (i) data placement within the cache, (ii) vStore metadata placement on disk, (iii) complication introduced by the vStore logic. For (i), if sequential blocks in a virtual disk are placed far apart in the cache, a sequential read of these blocks incurs a high overhead due to a long disk seek time. Therefore, in one embodiment, vStore keeps a virtual disk as sequential as possible in the limited cache space. For (ii), ideally, on-disk metadata should be small and should not require an additional disk seek to access data and metadata separately. For (iii), one potential overhead is the dependency among outstanding requests. For example, if one request is about to evict one cache entry, then all the requests on that entry must wait. All of these factors may be considered in the design of vStore.

Figure 2:
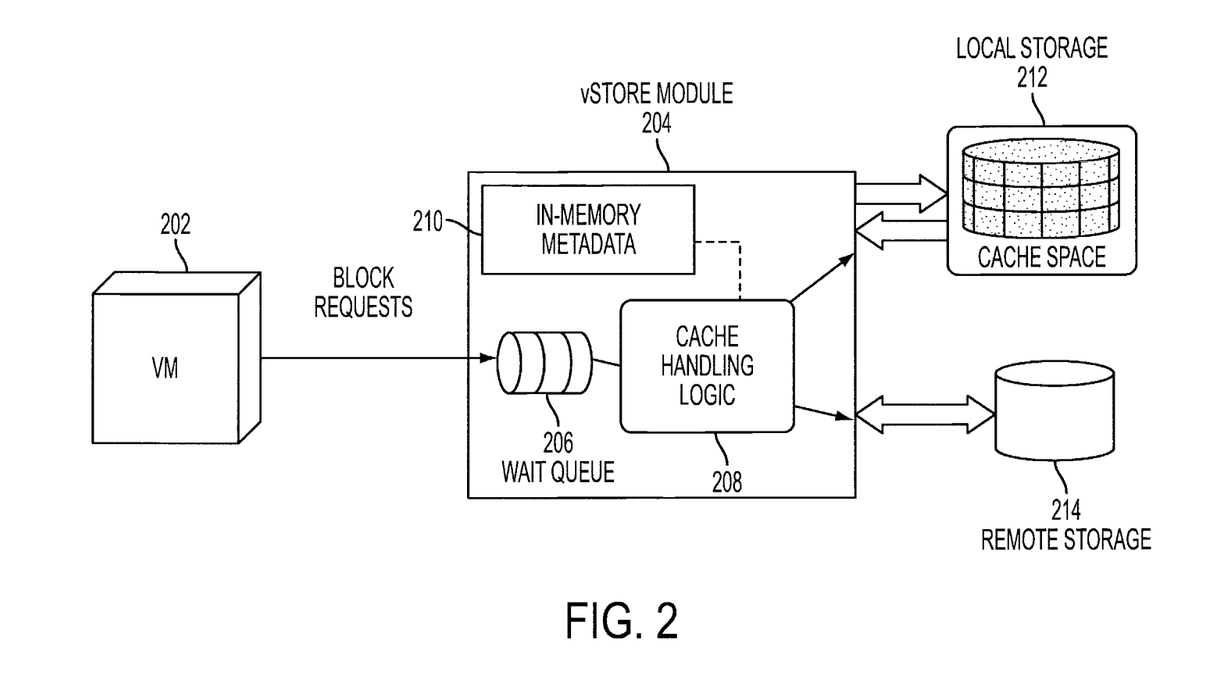
FIG. 2 shows the architecture of vStore in one embodiment of the present disclosure.

FIG. 2 shows the architecture of vStore in one embodiment of the present disclosure. The description herein is based on para-virtualized Xen as an example. VMs 202 generate block requests in the form of (sector address, sector count). Requests arrive at the front-end device driver within the VM 202 after passing through the guest kernel. Then they are forwarded to the back-end driver in Domain-0. The back-end driver issues actual I/O requests to the device, and send responses to the guest VM 202 along the reverse path.

In one embodiment, the vStore module 204 runs in Domain-0, and extends the function of the back-end device driver. vStore 204 intercepts requests and filters them through its cache handling logic. In FIG. 2, vStore 204 internally may include a wait queue 206 for incoming requests, a cache handling logic 208, and in-memory metadata 210. Incoming requests are first put into vStore's wait queue 206. The wait queue 206 is used in one embodiment because the cache entry that this request needs to use might be under eviction or update triggered by previous requests. After clearing such conflicts, the request is handled by the cache handling logic 208. The in-memory metadata 210 are consulted to obtain information such as block address, dirty bit, and modification time. Depending on the current cache state, actual I/O requests are made to either the cache on local storage 212 or the network attached storage 214.

I/O Unit: Guest VMs usually operate on 4 KB blocks, but vStore can perform I/Os to and from the network attached storage at a configurable larger unit. A large I/O unit reduces the size of in-memory metadata, as it reduces the number of cache entries to manage. Moreover, a large I/O unit works well with high-end storage servers, which are optimized for large I/O sizes (e.g., 256 KB or even 1 MB). Thus, reading a large unit is as efficient as reading 4 KB. This may increase the incoming network traffic, but our evaluation shows that the subsequent savings outweigh the initial cost. We use the term, block group, to refer to the I/O unit used by the vStore as opposed to the (typically 4 KB) block used by the guest VMs. That is, one block group contains one or more 4 KB blocks.

Metadata: Metadata holds information about cache entries on disk. Metadata are stored on disk for data integrity and cached in memory for performance. Metadata updates are done in a write-through manner. After a host crashes and recovers, vStore visits each metadata entry on disk and recovers any dirty data that have not been flushed to network attached storage. Table 1 summarizes examples of the metadata fields in one embodiment of the present disclosure.

TABLE 1 vStore Metadata.

| Fields | Size | Descriptions |
| --- | --- | --- |
| Virtual Disk ID | 2 Bytes | ID assigned by vStore to uniquely identify a virtual disk. An ID is unique only within individual hypervisors. |
| Sector Address | 4 Bytes | Cache entry's remote address in unit of sector. |
| Dirty Bit | 1 Bit | Set if cache content is modified. |
| Valid Bit | 1 Bit | Set if cache entry is being used and the corresponding data is in the cache. |
| Lock Bit | 1 Bit | Set if under modification by a request. |
| Read Count | 2 Bytes | How many read accesses within a time unit. |
| Write Count | 2 Bytes | How many write accesses within a time unit. |
| Bit Vector | Variable | Each bit represents 4 KB within the block group. |

TABLE 1-continued vStore Metadata.

| Fields | Size | Descriptions |
| --- | --- | --- |
| | | Set if corresponding 4 KB is valid. The size is (block group)/4 KB bits. |
| Access Time | 8 Bytes | Most recently accessed time. |
| Total Size | <23 Bytes | |

Virtual Disk identifier (ID) identifies a virtual disk stored on network attached storage. When a virtual disk is detached and reconnected later, cached contents that belong to this disk is identified and reused. Bit Vector has one bit for each 4 KB block in a block group so that the states of 4 KB blocks in the same block group can be changed and tracked individually. Without Bit Vector, the states of 4 KB blocks in the same block group must always be changed together. As a result, when the VM writes to a 4 KB block, vStore must read the entire block group (including all 4 KB blocks in that block group) from network attached storage, merge with the 4 KB new data, and writes the entire block group to cache. With Bit Vector, vStore can write to the 4 KB data directly without fetching the entire block group, and then only change the affected 4 KB block's state in Bit Vector. Our experiments show that Bit Vector helps reduce network traffic when using a large cache unit size.

Maintaining metadata on disk may compromise performance. A naive implementation may require two disk accesses to handle one write request issued by a VM—one for metadata update and one for writing actual data. In the present disclosure in one embodiment, vStore solves this problem by putting metadata and data together, and updates them in a single write. The details are described below.

In-memory Metadata: To avoid disk I/Os for reading the on-disk metadata, vStore in one embodiment maintains a complete copy of the metadata in memory and updates them in a write-through manner. One embodiment of the present disclosure use a large block group size (e.g., 256 KB) to reduce the size of the in-memory metadata.

Cache Structure: vStore in one embodiment of the present disclosure organizes local storage as a set-associative cache with write-back policy by default. We describe the cache as a table-like structure, where a cache set is a column in the table, and a cache row is a row in the table. A cache row includes multiple block groups. A block group has contents coming from one virtual disk, but different block groups in the same cache row may have contents coming from different virtual disks. Block groups in the same cache row are laid out in logically contiguous disk blocks in one embodiment of the present disclosure.

Figure 3:
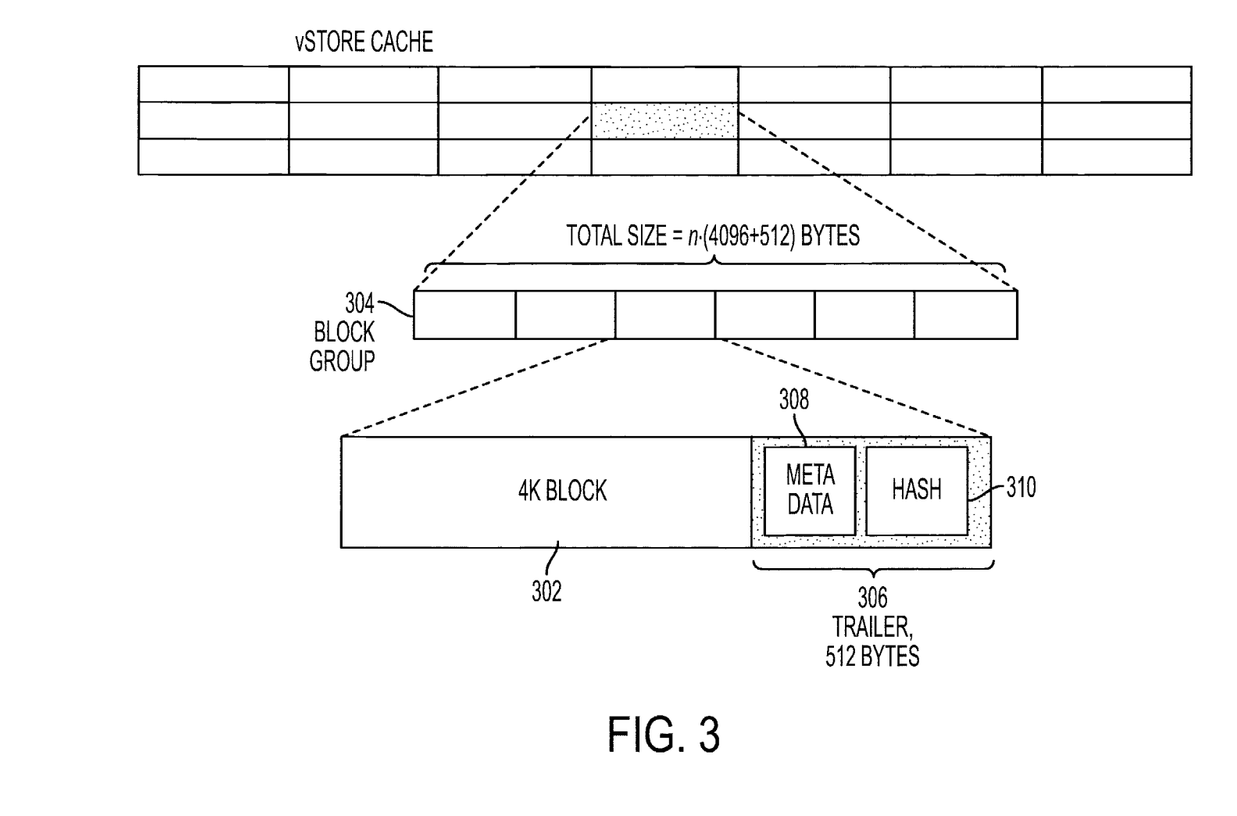
FIG. 3 illustrates structure of one cache entry in one embodiment of the present disclosure.

FIG. 3 illustrates structure of one cache entry in one embodiment of the present disclosure. A block group includes n number of 4 kilobyte (KB) blocks and each 4 KB blocks have trailers. For instance, each 4 KB block 302 in a block group 304 has a 512-byte trailer 306 shown in FIG. 3. This trailer 306 in one embodiment includes metadata 308 and the hash value 310 of the 4 KB data block 302. On a write operation, vStore computes the hash of the 4 KB block 302, and writes the 4 KB block 302 and its 512-byte trailer 306 in a single write operation. If the host crashes during the write operation, after recovery, the hash value helps detect that the 4 KB block and the trailer are inconsistent. The 4 KB block can be safely discarded, because the completion of the write operation has not been acknowledged to the VM yet. When handling a read request, vStore also reads the 512-byte trailer 306 together with the 4 KB block 302. As a result, a sequential read of two adjacent blocks issued by the VM is also sequential in the cache. If only the 4 KB data block is read without the trailer, the sequential request would be broken into two sub-requests, spaced apart by 512 bytes.

Cache Replacement

In one aspect, simple policies like least recently used (LRU) and least frequently used (LFU) may not be suitable for vStore, because they are designed primarily for memory-based cache without consideration of block sequentiality on disk. If two consecutive blocks in a virtual disk are placed at two random locations in vStore's cache, sequential I/O requests issued by the VM become random accesses on the physical disk. In one embodiment, vStore's cache replacement algorithm strives to preserve the sequentiality of a virtual disk's blocks.

Below, we describe an embodiment of vStore's cache replacement algorithm in detail. We introduce the concept of base cache row of a virtual disk. The base cache row is the default cache row on which the first row of blocks of a virtual disk is placed. Subsequent blocks of the virtual disk are mapped to the subsequent cache rows. For example, if there are two virtual disks $Disk_1$ and $Disk_2$ currently attached to the vStore and the cache associativity is 5 (i.e., there are 5 cache rows), then Disk might be assigned 1 as a base cache row and $Disk_2$ might be assigned 3 to keep them reasonably away from each other. If we assume one cache row is made of ten 128 KB cache groups, $Disk_2$'s block at address 1280K will be mapped to row 4 which is the next row from $Disk_2$'s base cache row.

Upon arrival of new data block, vStore in one embodiment determines the cache location in two steps. First, it looks at the cache entry's state whose location is calculated using the base cache row and the block's address. If it is invalid or not dirty, then it is immediately assigned to the cache entry. If dirty, a victim entry is selected based on the scores. Six criteria may be used to calculate the score one embodiment.

Recentness—E.g., the more recently accessed, higher the score.

Prior Sequentiality—This measures how sequential the cache entry is with respect to the adjacent cache entries. If the cache entry is already sequential, then we prefer to keep it in one embodiment.

Prior Distance—This measures how far away the cache entry is from the default base cache row. If the entry is located in cache row 2 and the default base cache row of the virtual disk is 1, then the value is 2−1=1.

Posterior Sequentiality—This measures how sequential it will be if we cache new block. If it becomes sequential, then we prefer this cache entry as a victim.

Posterior Distance—This measures how far away from the default base cache row it would be if we cache new block. If this distance is far, it is less preferable.

Dirtiness—If the cache entry is modified, we would like to avoid evicting this entry as much as possible.

Let $x_i$ be each of the six criteria described above, e.g., for i=1 to 6. A score may be computed using equation (1) as follows.

$$S = a_0 \cdot x_0 + a_1 \cdot x_1 + \ldots + a_5 \cdot x_5 \quad (1)$$

Here the coefficient $a_i$ represents the weight of each criterion. If all $a_i$ is 0 except for $a_5$, the eviction policy becomes equivalent to LRU. Weight coefficients are adjustable according to the preference. In one embodiment, this value (score) is computed for all the cache entry within the cache set and the entry with the lowest score is chosen for eviction.

Cache Handling Operations

In one embodiment of the present disclosure, there may be three cases in cache handling—cache hit, miss without flush and miss with flush. In one embodiment, vStore design considers both performance and data integrity in its cache handling operations. Since vStore uses disk as a cache space, cache handling has more disk access than when cache were not used. Excessive disk accesses may degrade the overall performance and reduce the merit of using vStore. In one embodiment of the present disclosure, disk accesses are minimized to make the performance loss tolerable. vStore may address data integrity, in one embodiment as follows. 512 byte trailer to each 4K blocks is added to record hash of it. In order to minimize disk I/O in one embodiment of the present disclosure, we read and write the trailer together. This only increases data size, but does not increase the number of I/O. However, for cache miss handling, additional disk I/O for data integrity may be introduced. In general, such consistency issue complicates overall cache handling and there may be a trade-off between maintaining consistency and performance penalty due to additional disk I/O.

Figure 4A:
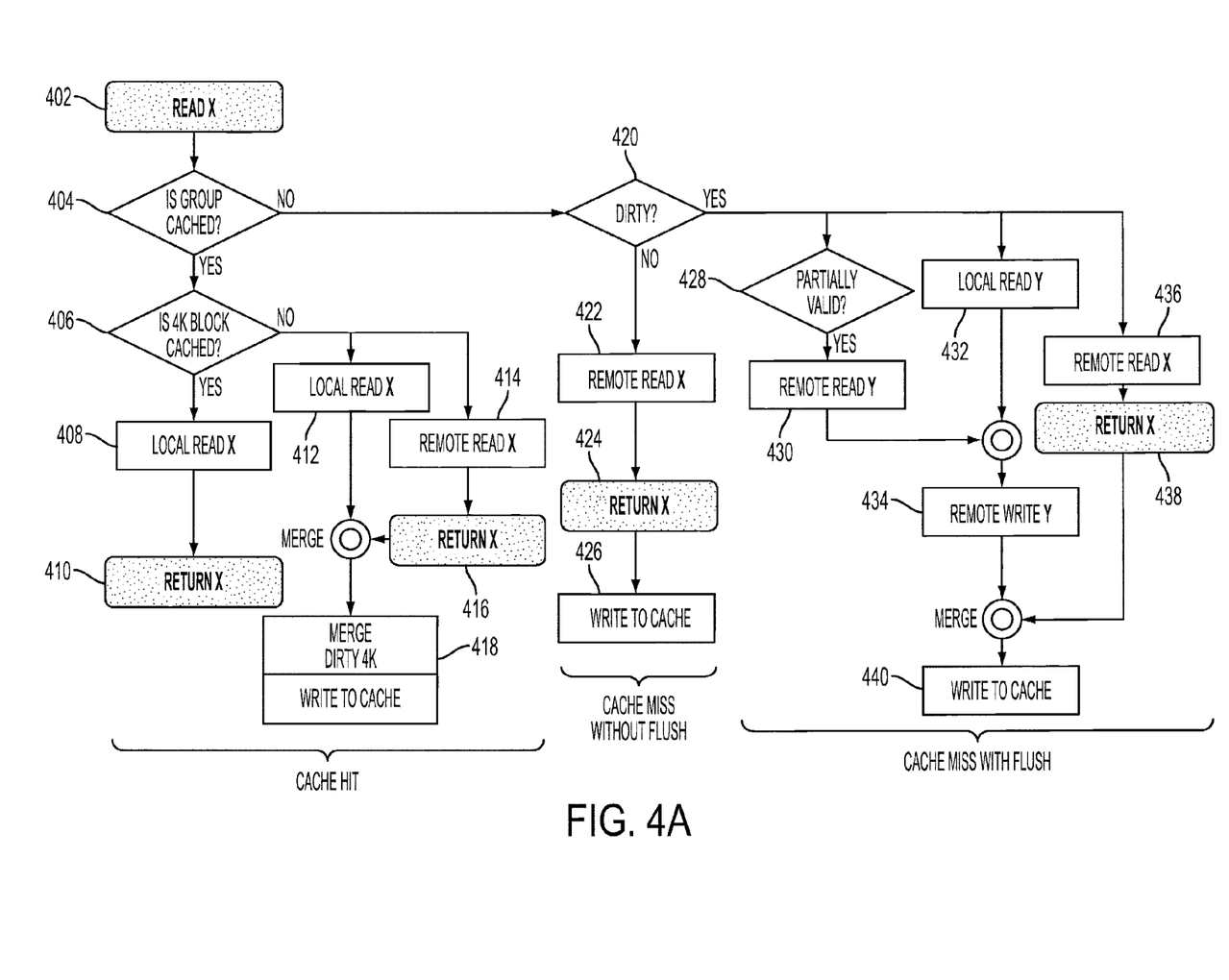
FIG. 4A is a flow diagram illustrating a read request handling in one embodiment of the present disclosure.
Figure 4B:
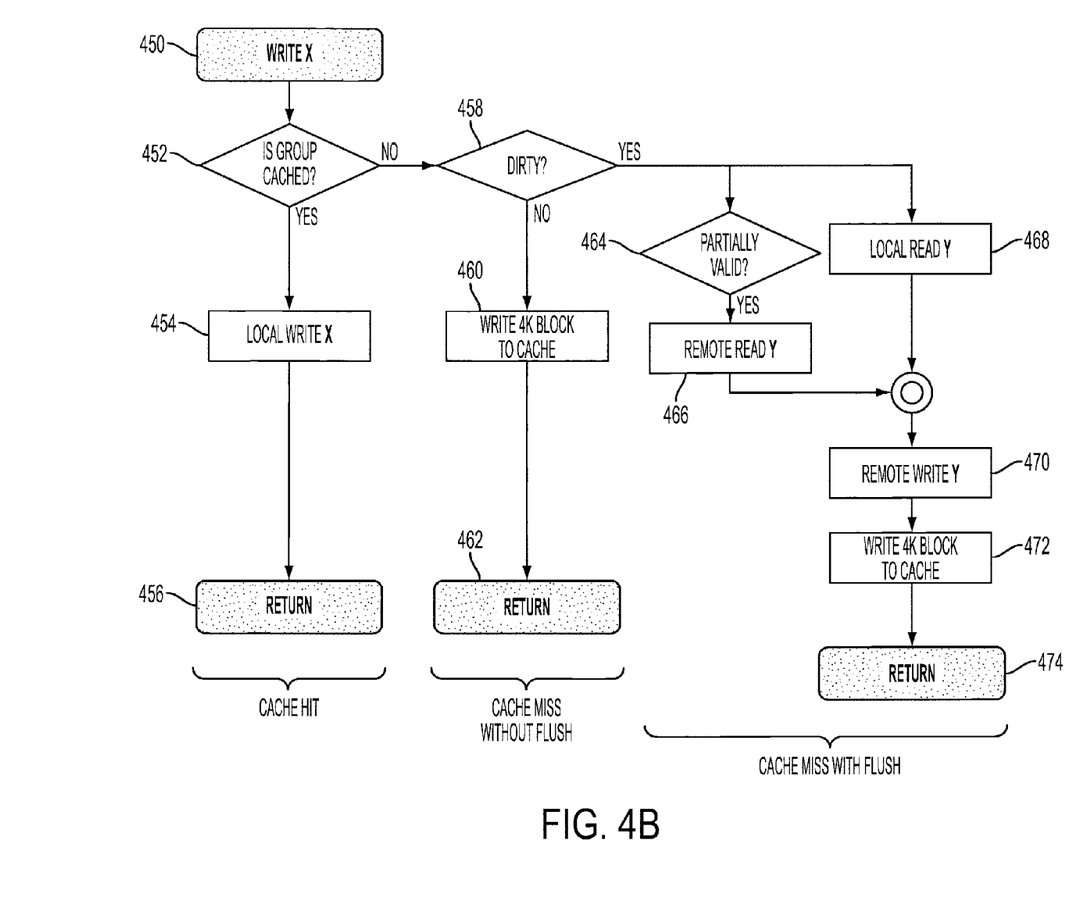
FIG. 4B is a flow diagram illustrating a write request handling in one embodiment of the present disclosure.

FIG. 4A is a flow diagram illustrating a read request handling in one embodiment of the present disclosure. FIG. 4B is a flow diagram illustrating a write request handling in one embodiment of the present disclosure.

READ Handling

FIG. 4A illustrates a flow diagram for read cache handling in one embodiment of the present disclosure. At 402, a read request is received. The read request may originate from an application in a VM, for example to read data X. At 404, it is determined whether the block group which stores the data of the read request is already cached. For example, the sector address of the read data is compared with the in-memory metadtata to determine whether the block group is cached already. If it is determined that the block group is cached, the flow logic proceeds to 406, otherwise the flow logic proceeds to 420.

Using a virtual disk involves multiple steps: open the virtual disk, perform reads/writes, and finally close the virtual disk. When the virtual disk was opened, vStore assigns a "Virtual Disk ID" to the virtual disk and maps it to a remote disk on storage server (virtual disk ID was described previously). This mapping relationship is kept in a mapping table, and stored both in memory and on disk in one embodiment. When the VM issues a read request, vStore knows the Virtual Disk ID implicitly (because the request comes from a previously opened handle) and the sector address is specified explicitly. Combining the virtual disk ID and the sector address as one search key to look up the in-memory metadata can determine whether the data is cached and if so which block group currently caches the data. The following shows an example data structure of the combined search key.

| | |
|---|---|
| Virtual Disk ID | 2 Bytes |
| Sector Address | 4 Bytes |

At 406, it is determined whether the 4 KB block corresponding to the requested read data, e.g., data X is cached. If so, at 408, local disk is read to retrieve the data. At 410, the data is returned to the requestor. If at 406, it is determined that parts of the requested read data are cached while other parts are not cached (e.g., 1 KB in the cache and 3 KB on remote storage server), the cached block group from the local disk is read at 412. At 414, data corresponding the requested read data is read from the remote disk and returned at 416. At 418, the locally read data and the remotely read data are merged. The merged data is written to cache for later reuse on a cache hit.

At 404, if it is determined that the block group corresponding to the requested read data is not cached, the cache replacement algorithm chooses a location in the cache to hold the requested read data. At 420, it is determined whether the old data currently cached at that location is dirty, i.e., the old data of that cache entry needs to be stored or updated in the remote storage since that old data will be evicted from the cache. At 420, if the cache entry is not dirty, the requested read data is read from the remote storage device at 422. The data is returned at 424 and written to cache at 426.

At 420, if it is determined that the old data in the cache entry is dirty, at 428, Bit Vector is examined to determine whether the old data in the cache entry is partially valid, i.e., part of the data are stored in the cache while the other part are stored on the remote storage server. Partial validity may be determined, for example, by reading the bit vector values for each of the 4 KB blocks in the block group. For instance, if a bit in the bit vector is 0, that part of the data is in local cache. If it is 1 that part of the data is on remote storage. If it is determined that the existing data in the cache entry is partially valid, the corresponding data from the remote storage device is read at 430. At 432, if the entire data of the cache entry is valid, the data is read from the local storage. At 434, the cache entry data is written to remote storate. If the cache entry data has partially valid data, the remotely read data (at 430) is merged with the locally read data (at 432) before the data is written to the remote storage at 434. At 436, the requested read data is read from the remote storage. The read data is returned at 438 to the requestor (e.g., the application that requested it). At 440, the requested read data retrieved from the remote storage is written to cache. Here, the merge at 442 implies a wait for operations on both incoming links (434, 438) to complete, before performing the operation on the outgoing link (440). This is used, for example, to guarantee data integrity or to wait for data from both lock disk and remote storage.

A difference of read handling in FIG. 4A from write handling shown in FIG. 4B is that vStore can return the data as soon as it is available and continue the rest of the cache operations in background. This is reflected in the miss handling operations (e.g., 420 to 440). For example, remote read (e.g., 422, 436) may be initiated first. As soon as vStore finishes reading the requested block, it returns with the data (e.g., 424, 438). On-disk metadata update and cache data write may be performed afterwards (e.g., 426, 440).

WRITE Handling

FIG. 4B is a flow diagram illustrating a write request handling in one embodiment of the present disclosure. At 450, write request (or command) is received to write data (e.g., data X).

At 452, it is determined whether the block group to which the requested write data belongs, is cached, e.g., using virtual disk ID and sector number as the search key to look up the in-memory metadata. At 454, if the data is cached, the data is written to the local storage, i.e., cached. At 456, the process returns, for instance, acknowledging successful write to the requestor.

At 458, if the block group is not cached, it is determined as to whether the block group is dirty, i.e., whether the data content of the block group is modified. Whether the content of the block group is modified may be determined from reading the metadata associated with the block group and the values for the dirty bits of the 4 KB blocks contained therein. At 460, if the content of the block group is determined to be not modified (i.e., not dirty), the requested write data is written to cache. At 462, the process returns, for instance, acknowledging successful write to the requestor.

If the content of the block group is modified, that data should be written out to the remote storage before the write data can overwrite the existing content of the block group. At 464, if the content of the block group is dirty (modified), it is determined whether the current content of the block group is partially valid. At 466, if the content is only partially valid, the remotely stored data corresponding to that content is read. This data may be merged with the current content of the block group in the local storage in order to make the local block group content wholely valid. At 468, the block group's content is read at 468. At 470, the content of the block group is written to the remote storage. At 472, the requested write data is written to cache at the location of the block group. At 474, the process returns, for instance, acknowledging successful write to the requestor.

For write requests, vStore in one embodiment directly writes the data to the cache without accessing the network attached storage. This simplifies operations of cache hit and cache miss without flush. But, write handling for cache miss with flush may make several I/O requests. In FIG. 4B, the write handling returns at the end of entire operation sequences. In the worst case, write handling incurs at most four disk I/Os, which may occur in the case of cache miss with flush.

Destaging

Destaging refers to the process of flushing dirty (modified) data in the cache to the network attached storage. The destaging functionality in one embodiment of the present disclosure may be used to keep the proportion of dirty blocks under a specified level. Large number of dirty blocks is potentially harmful to the performance because evicting a dirty cache entry delays the cache handling operations significantly due to flushing operations. In addition, detachment of a virtual disk can be faster when there are less number of dirty blocks. If a VM wants to terminate or migrate, it has to detach the virtual disk. As part of the detachment process, all the dirty blocks belonging to the detaching storage has to be flushed. Without destaging, the amount of data that has to be transferred can be as large as orders of several gigabytes. Transferring that amount of data takes time and also generates bursty traffic.

Mechanism Design

In one embodiment of the present disclosure, destaging may be triggered when the number of dirty blocks in the cache exceeds the user-specified level, which we call the pollution level. For example, if the pollution level is set to be 65%, it means that user wants to keep the ratio of dirty blocks to total blocks below 65%.

Upon destaging, vStore in one embodiment may determine how many blocks to destage at a given time t. Basic idea in one embodiment is to maintain a window size $w_t$ which indicates the total allowed data transmission size in unit of bytes per millisecond (Bpms). This window size is the combined data transmission size for both normal remote storage accesses and the destaging. It is specified as a rate (Bpms) since destaging action can be fired at irregularly. If $w_t$ increases, then may be more likely that normal network attached storage access would leave more bandwidth available for destaging.

Control technique for $w_t$ in vStore may adopt the technique used for flow control in FAST TCP and for queue lengths adjustment. $w_t$ may be adjusted using the network attached storage latency. Let R be the desired network attached storage latency. Let $R_t$ be the exponentially weighted moving average of observed network attached storage latency expressed as $R_t=(1-\alpha)R+\alpha R_{t-1}$, where $\alpha$ is a smoothing factor. We calculate $w_t$ using $$w_t = (1 - \gamma)w_{t-1} + \gamma \frac{R}{R_t} w_{t-1} \qquad (2)$$

where $\gamma$ is another smoothing factor for $w_t$. If observed remote latency is smaller than R, then $w_t$ will increase and vice versa. In vStore, we also may consider the local latency denoted as $v_t$. If we let $L_t$ be the latency of local disk, we calculate $v_t$ as $$v_t = (1 - \gamma)v_{t-1} + \gamma \frac{L}{L_t} v_{t-1}.$$

Figure 5:
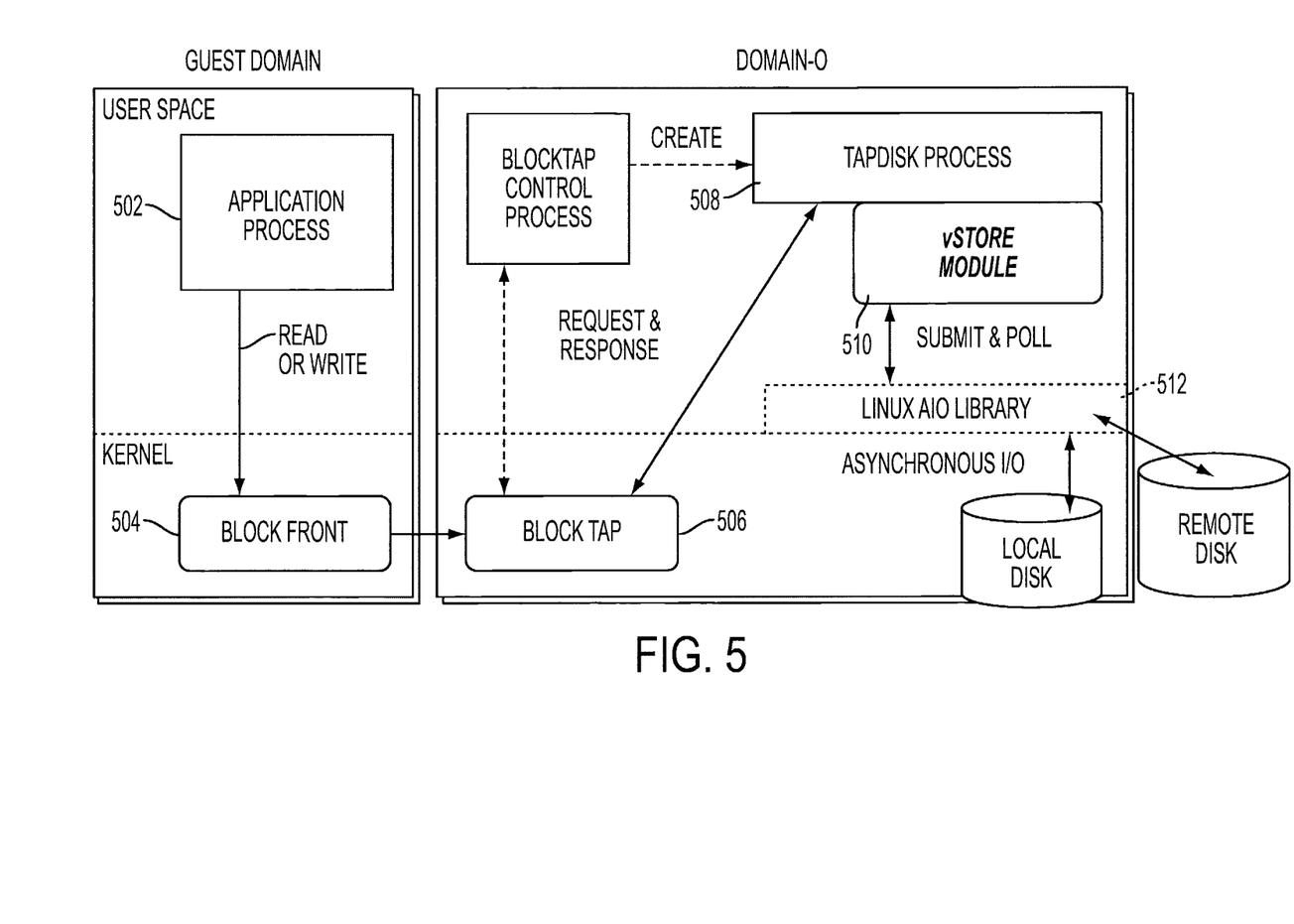
FIG. 5 shows as an example, the Xen implementation of vStore in one embodiment of the present disclosure.

We take the minimum of $w_t$ and $v_t$ as the window size. Next we calculate how many block groups to destage using determined window size. Let $d_t$ denote the number of destage I/O to perform at time t, then $$d_t=(\min(v_t,w_t)\times\tau_t-C_t)/B \qquad (3)$$

where $\tau_t$ is time length between t and t−1 in millisec, B the block group size and $C_t$ pending I/O requests at time t in bytes. $C_t$ represents the remote access from normal file system operations. Destaging may happen only if $d_t>0$.

vStore may be implemented using Xen's blktap interface. Xen is a virtual machine montior. Virtual machine monitor, also referred to as hypervisor, allows guest operating systems to execute on the same computer hardware concurrently. Other virtual machine monitors may be used for implementing the vStore. FIG. 5 shows as an example, the Xen implementation of vStore in one embodiment of the present disclosure. Blktap mechanism redirects a VM's disk I/O requests to a tapdisk process 508 running in the userspace of Domain-0. In a para-virtualized VM, user application 502 reads or writes to the blkfront device 504. Normally blkfront connects to the blkback and all the block traffics are delivered to it. If blktap 506 is enabled, blktap replaces blkback and all the block traffics are now redirected to the tapdisk process 508. Overall the blktap mechanism provides convenient method to intercept block traffics and implement new functionalities in the user space.

Xen ships with several types of tapdisks so that tapdisk process can open the block device using the specified disk type. Disk types are simply a set of callback functions such as open, close, read, write, do callback and submit. Among several disk types, synchronous I/O type uses normal read, write system calls to handle each incoming block I/Os. AIO-based disk type uses Linux AIO library to issue multiple block requests in a batch. vStore also may implement those pre-defined set of callback functions and registers to tapdisk as another type of tapdisk. vStore 510 may be based on the asynchronous I/O mechanism. For example, vStore submits requests to the Linux AIO library 512 and periodically polls for completed I/Os. Thus, internal structure of vStore 510 may be an event-driven architecture. A vStore also may be implemented using synchronous I/O in another embodiment.

In another aspect, the architecture of the present disclosure may also include cloud storage infrastructure which has features such as cache block transfer between VM hosts to support fast migration, replication of cache blocks to nearby storage (possibly at higher level of hierarchy or same rack) within other hosts to support fast restart of VMs on a failed host, and an intelligent workload balancing mechanism between using the local storage and the remote storage for performance and/or cost optimization, e.g., a mechanism to dynamically determine using remote storage or local cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A storage system for handling data for virtual machines, comprising:
   a virtual storage module operable to run in a virtual machine monitor, the virtual storage module including at least,
   a wait-queue operable to store incoming block-level data requests from one or more virtual machines;
   in-memory metadata for storing information associated with data stored in local persistent storage that is local to a host computer hosting the virtual machines, the data stored in local persistent storage being replication of a subset of data in one or more virtual disks provided to the virtual machines, the virtual disks being mapped to remote storage accessible via a network connecting the virtual machines and the remote storage; and
   a cache handling logic operable to handle the block-level data requests by obtaining the information in the in-memory metadata and making I/O requests to the local persistent storage or the remote storage or combination of the local persistent storage and the remote storage to service the block-level data requests, wherein the cache handling logic replaces data in the local persistent storage based on a score determined from summing weighted values associated with how recently the data was accessed, how sequential the data is with respect to an adjacent data, how far away the data is from a base row, how sequential the data would be if new block is cached, how far away from the base row the data would be if a new block is cached, and whether the data is modified.

2. The system of claim 1, wherein the in-memory metadata includes at least virtual disk identifier that identifies a virtual disk stored on the remote storage, remote address of the data in the remote storage, a bit vector that indicates whether the data is valid, and a dirty bit that indicates whether the data is modified.

3. The system of claim 2, wherein the virtual storage module manages block groups and performs I/O requests to the local persistent storage in units of one or more predetermined sized blocks.

4. The system of claim 3, wherein each block stored in the local persistent storage includes a trailer that stores metadata of the block and hash value of the block used for checking data integrity of data content of the block, wherein after a host crash and recovery, the virtual storage module can examine the trailer to determine a virtual disk that owns said each block stored in the local persistent storage, and determine whether the data content of the block and the hash value are consistent.

5. The system of claim 4, wherein the data content of the block and the trailer are read and written together in a single disk I/O operation.

6. The system of claim 3, wherein the virtual storage module organizes the local persistent storage as set-associative cache structured into a table-like structure with rows and columns, each of the rows having multiple block groups wherein the block groups in a same row are laid out in logically contiguous disk blocks, and wherein each block group in the same row can store contents coming from a different virtual disk.

7. The system of claim 6, wherein the one or more predetermined sized blocks can store data and metadata associated with the data, and wherein the in-memory metadata includes each of the metadata stored in the one or more predetermined sized blocks.

8. The system of claim 7, wherein the predetermined sized blocks can further store hash value of the data.

9. The system of claim 1, wherein the virtual storage module automatically destages modified data in the local persistent storage to the remote storage in response to determining that the modified data has reached a threshold.

10. The system of claim 9, wherein the virtual storage module further determines how many blocks of data to destage at a given time based on total allowed data transmission size including combined data transmission size for both remote storage accesses and destaging.

11. The system of claim 1, wherein the in-memory metadata are persisted on disk in a write-through manner to guarantee data integrity in an event of a host crash.

12. A method for handling data storage for virtual machines, comprising:
   intercepting one or more incoming block-level data requests received by a virtual machine monitor from one or more virtual machines;
   obtaining from in-memory metadata, information associated with data of the block-level data request, the in-memory metadata for storing information associated with data stored in local persistent storage that is local to a host computer hosting the virtual machines, the data stored in local persistent storage being replication of a subset of data in one or more virtual disks provided to the virtual machines, the virtual disks being mapped to remote storage accessible via a network connecting the virtual machines and the remote storage; and
   making I/O requests to the local persistent storage or the remote storage or combination of the local persistent storage and the remote storage to service the block-level data requests, further comprising replacing data in the local persistent storage based on a score determined from summing weighted values associated with how recently the data was accessed, how sequential the data is with respect to an adjacent data, how far away the data is from a base row, how sequential the data would be if new block is cached, how far away from the base row the data would be if a new block is cached, and whether the data is modified.

13. The method of claim 12, wherein the in-memory metadata includes at least virtual disk identifier that identifies a virtual disk stored on the remote storage, remote address of the data in the remote storage, a bit vector that indicates whether the data is valid, and a dirty bit that indicates whether the data is modified.

14. The method of claim 13, further including managing block groups and performing I/O requests to the local persistent storage in units of predetermined sized blocks.

15. The method of claim 14, further including organizing the local persistent storage as set-associative cache structured into a table-like structure with rows and columns, each of the rows having multiple block groups wherein the block groups in a same row are laid out in logically contiguous disk blocks, and wherein each block group in the same row can store contents coming from a different virtual disk.

16. The method of claim 15, wherein the one or more predetermined sized blocks can store data and metadata associated with the data, and wherein the in-memory metadata includes each of the metadata stored in the one or more predetermined sized blocks.

17. The method of claim 16, wherein the predetermined sized blocks can further store hash value of the data.

18. The method of claim 12, further including automatically destaging modified data in the local persistent storage to the remote storage in response to determining that the modified data has reached a threshold.

19. The method of claim 18, further including determining how many blocks of data to destage at a given time based on total allowed data transmission size including combined data transmission size for both remote storage accesses and destaging.

20. A computer readable storage medium storing a program of instructions executable by a machine to perform a method for handling data storage for virtual machines, comprising:

intercepting one or more incoming block-level data requests received by a virtual machine monitor from one or more virtual machines;

obtaining from in-memory metadata, information associated with data of the block-level data request, the in-memory metadata for storing information associated with data stored in local persistent storage that is local to a host computer hosting the virtual machines, the data stored in local persistent storage being replication of a subset of data in one or more virtual disks provided to the virtual machines, the virtual disks being mapped to remote storage accessible via a network connecting the virtual machines and the remote storage; and making I/O requests to the local persistent storage or the remote storage or combination of the local persistent storage and the remote storage to service the block-level data requests, wherein the in-memory metadata includes at least virtual disk identifier that identifies a virtual disk stored on the remote storage, remote address of the data in the remote storage, a bit vector that indicates whether the data is valid, and a dirty bit that indicates whether the data is modified, wherein the method further includes managing block groups and performing I/O requests to the local persistent storage in units of predetermined sized blocks; and organizing the local persistent storage as set-associative cache structured into a table-like structure with rows and columns, each of the rows having multiple block groups wherein the block groups in a same row are laid out in logically contiguous disk blocks, wherein each block group in the same row can store contents coming from a different virtual disk, wherein the one or more predetermined sized blocks can store data and metadata associated with the data, and wherein the in-memory metadata includes each of the metadata stored in the one or more predetermined sized blocks, further comprising replacing data in the local persistent storage based on a score determined from summing weighted values associated with how recently the data was accessed, how sequential the data is with respect to an adjacent data, how far away the data is from a base row, how sequential the data would be if new block is cached, how far away from the base row the data would be if a new block is cached, and whether the data is modified.

* * * * *